June 26, 1923.

H. N. GRESLEY 1,459,977

RAILWAY AND TRAMWAY VEHICLE

Filed Oct. 23, 1922    3 Sheets-Sheet 1

June 26, 1923.

H. N. GRESLEY

RAILWAY AND TRAMWAY VEHICLE

Filed Oct. 23, 1922    3 Sheets-Sheet 3

Inventor
Herbert N. Gresley
by Herbert W. Jenner
Attorney

Patented June 26, 1923.

1,459,977

UNITED STATES PATENT OFFICE.

HERBERT NIGEL GRESLEY, OF DONCASTER, ENGLAND, ASSIGNOR TO THE LEEDS FORGE COMPANY, LIMITED, OF LEEDS, ENGLAND.

RAILWAY AND TRAMWAY VEHICLE.

Application filed October 23, 1922. Serial No. 596,264.

*To all whom it may concern:*

Be it known that I, HERBERT NIGEL GRESLEY, a subject of the King of Great Britain and Ireland, residing at Doncaster, England, have invented certain new and useful Improvements in or Relating to Railway and Tramway Vehicles; and I do hereby declare the following to be a full, clear, and exact description of the invention, such as will enable others skilled in the art to which it appertains to make and use the same.

This invention relates to railway and tramway vehicles of the kind in which the adjacent ends of two vehicles are supported by one common bogie the other end of either or each of the said vehicles being supported on an independent bogie or on another bogie which also supports one end of another vehicle. Arrangements of this kind are described in the specification of prior Letters Patent No. 1,412,053 issued on April 11, 1922, to The Leeds Forge Company, Limited as assignee of Herbert Nigel Gresley.

The object of the present invention is to eliminate or reduce the swaying of vehicles connected together in this way which tends to take place when running particularly on curved portions of the track.

For this purpose according to the invention the coupling arrangement comprises spring control gear adapted to be stressed upon the vehicles assuming angular positions relatively to each other such as occur should the vehicles sway when running.

Preferably in an arrangement embodying the invention the springs are normally under initial pressure when the vehicles are in line so that the said springs tend to maintain the vehicles in line with the adjacent ends of the vehicles parallel to each other.

It is desirable to arrange the springs at opposite sides of and at suitable or equal distances from the longitudinal centre line of the vehicles.

A practical embodiment of the invention is to mount the springs upon, or suitably associate them with, side rods or plungers that extend through the headstocks of adjacent vehicles. Each such side rod or plunger extends through the headstocks of two adjacent vehicles and at the inner side of each of said headstocks the corresponding end of the side rod or plunger has freely mounted upon it two compression plates between which is arranged a spring through which the rod extends, abutments for said bearing plates being carried by the headstock and the arrangement being such that when the vehicles are travelling round a curve the springs of the inner side rod or plunger are compressed by the compression plates which are nearest the headstock and against which shoulders on the rod or plunger abut, whilst the springs of the outer side rod or plunger are simultaneously compressed by the compression plates farthest from the headstocks and against which abut washers or collars on the rod or plunger backed by nuts or otherwise secured to the same.

Conveniently each spring and its compression plates are contained in a casing or guide the ends of which form the abutments for the spring compression plates and the said casing or guide is trunnioned or otherwise mounted to rock in a bearing bracket or brackets secured to the headstock or to adjacent members of the vehicle underframe. The springs may be of any desired type, either helical steel springs, rubber springs, or a combination of steel springs and rubber springs.

Fig. 1 of the accompanying drawings illustrates in plan an end portion of the underframe of a railway vehicle provided with spring control gear according to the invention. The said end of the vehicle is assumed to be supported on a bogie which also supports the adjacent end of another similar vehicle, the axis of the common bogie centre casting or swivel plate being indicated at $x$, and the parts are shown in the position they occupy when the vehicles are located upon a straight portion of the track so that they are in direct line one with the other.

Figure 1:
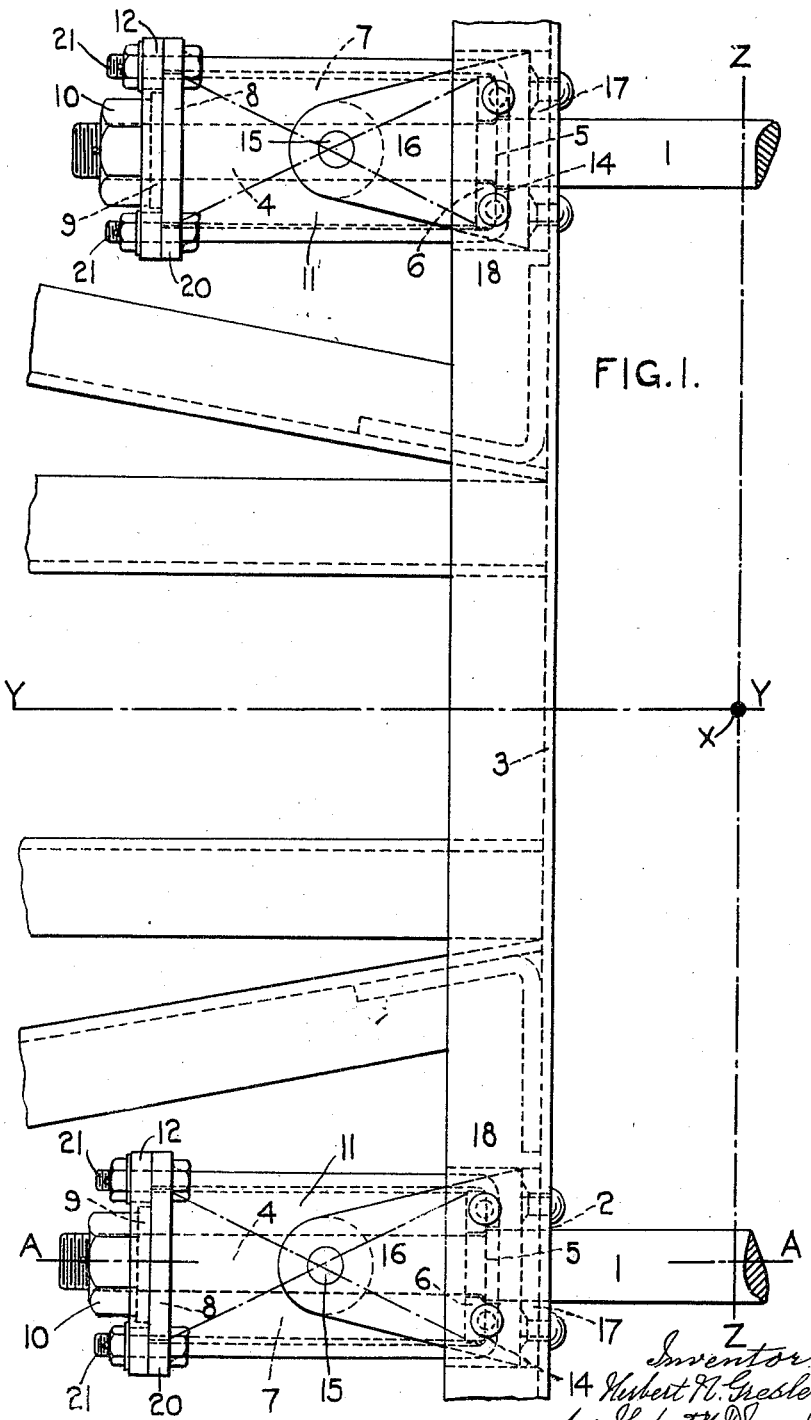

The arrangement of side control springs illustrated is suitable for application to railway vehicles the adjacent ends of which are supported upon a common bogie as described in my said prior specification No. 1,412,053.

The side rods or plungers each consists of a plain rod 1 of circular cross-section the ends of which extend freely through slots 2 formed therefor in the headstocks 3 of adjacent vehicles. The end portions 4 of the rod at the inner sides of the headstocks 3 are of reduced diameter so as to form shoulders 5 against which abut compression plates 6 for springs 7 that are mounted on the end portion of the rod 4 between the said compression plates 6 and other compression plates 8.

The extreme ends of the rod or plunger 1 are fitted with washers 9 backed by nuts 10 which washers form abutments for the outer compression plates 8 when the springs 7 are being stressed in one direction. The springs 7 are each located in a casing 11, the outer end of which is closed by a cover plate 12 suitably bolted thereto and formed with a hole 13 through which the rod extends. The said cover plate 12 forms an abutment for the outer compression plate 8 of the spring, whilst the inner end 14 of the casing 11, which is also formed with a hole through which the rod extends, forms an abutment for the inner compression plate 6. Each said casing 11 is provided with oppositely disposed trunnion pins 15, located about midway of the length thereof, which rock in the arms 16 of a bearing bracket 17 riveted or otherwise securely fixed to the head stock 3.

The bracket 17 is a stirrup shaped member the arms 16 of which embrace the casing 11 and the base of which is securely riveted to the inner face of the headstock 3. Rigidity of the bracket fixing is also secured by riveting the arms 16 of the bracket to the inwardly extending flanges 18 of the channel sectioned headstock, packing pieces 19 being interposed between the bracket arms and the said flanges, see Figs. 3 and 4.

Figure 3:
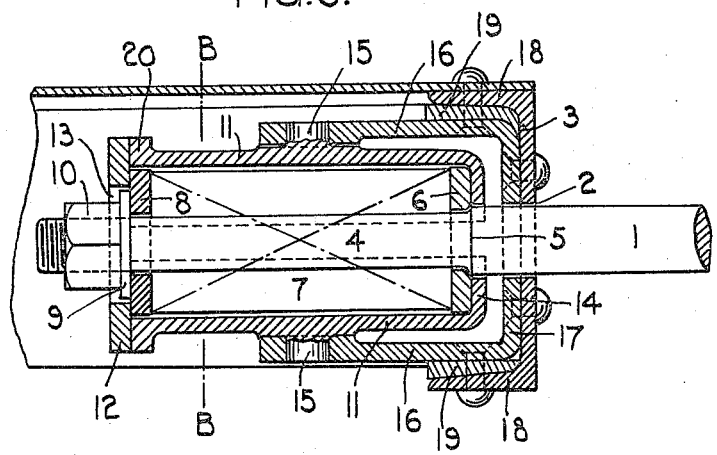
Fig. 3 is a vertical longitudinal section corresponding to the line A.A of Fig. 1.
Figure 4:
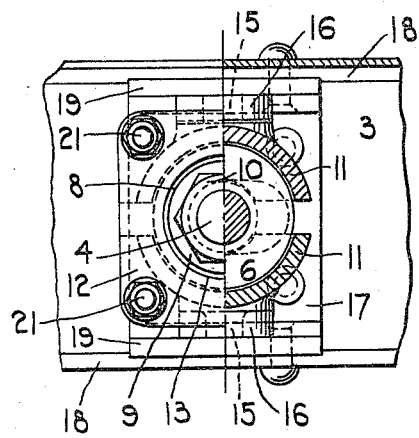
Fig. 4 is a view of the parts shown in Fig. 3, partly in end elevation and partly in vertical transverse section corresponding to the line B.B of Fig. 3.

The trunnions 15 are preferably formed in one with the casing 11 and to enable the trunnions to be engaged with the bearings formed therefor in the bracket arms 16, the said casing conveniently formed in halves, see Figs. 3 and 4, which are maintained in proper relative position when assembled, by the end plate 12 secured to an outwardly extending end flange 20 of the two part casing 11 by bolts 21. As will be seen the trunnion bearing bracket rigidly fixed to the headstock and the two-part spring casing 11 in one with which the trunnions 15 are formed presents a simple construction of the great strength required in view of the stresses to which it may be subjected when in use.

Figure 2:
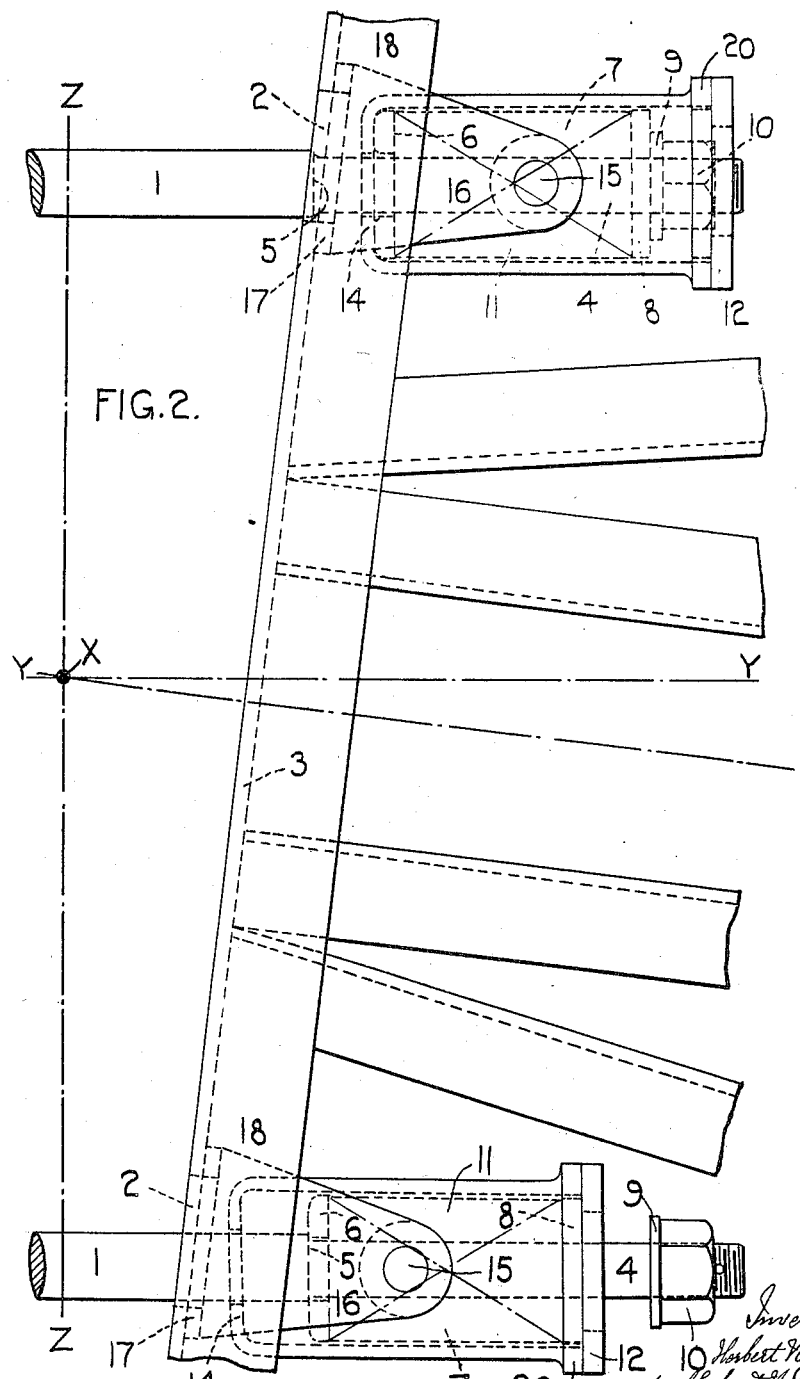
Fig. 2 is a similar view to Fig. 1 but showing the parts in the position assumed when the coupled vehicles are located upon curved portions of the track.

The line $y$ $y$ in Figs. 1 and 2 passing through the axis $x$ of the common supporting bogie centre casting or swivel plate indicates the longitudinal centre of the coupled vehicles when located upon a straight portion of the track. The line $z$ $z$ is a line also passing through the axis $x$ perpendicular to the longitudinal centre line $y$ $y$. When as in Fig. 1, the vehicles are upon straight portions of track the adjacent headstocks 3 of the vehicles are parallel to each other and to the line $z$ $z$. When the vehicles are upon curved portions of the track, the headstocks 3 assume angular positions relatively to each other and to the line $z$ $z$, see Fig. 2. In this position the springs 7 of the side rod or plunger 1 at the inner side of the curve are compressed towards the end cover plates 12 of the corresponding casings 11 by the compression plates 6 against which the shoulders 5 of the rods or plungers abut. At the same time the springs 7 of the side rod or plunger 1 at the outer side of the curve are compressed towards the ends 14 of the corresponding casings 11 by the compression plates 8 against which the washers 9 on the ends of the rod or plunger abut.

It will be understood that spring arrangements for reducing or eliminating undesirable swaying movements and thereby tending to steady railway and other vehicles connected together as before described, can be varied considerably in details of construction without departing from the invention.

What I claim as my invention and desire to secure by Letters Patent is:—

1. In a coupling arrangement for railway and tramway vehicles of the kind in which the adjacent ends of two vehicles are supported by one common bogie, spring control gear fitted to the vehicle headstocks and adapted to steady the vehicles when traveling on curved portions of the track.

2. A coupling arrangement according to the preceding claim wherein the springs of the spring control gear are under initial stress when the coupled vehicles are in line with each other so that they tend to maintain the adjacent ends of the vehicles parallel to each other, the springs being increasingly stressed upon the vehicles assuming angular positions relatively to each other when they are traveling on curved portions of the track.

3. A coupling arrangement according to claim 1 wherein the springs of the spring control gear are arranged at opposite sides of and at suitable distances from the longitudinal centre line of the vehicles.

4. A coupling arrangement according to claim 1 wherein the spring control gear comprises side rods or plungers that extend through the headstocks of adjacent vehicles and springs mounted upon such rods at the inner sides of the said headstocks.

5. A coupling arrangement according to claim 4 wherein the control springs are mounted on the end portions of the side rods or plungers, at the inner sides of the headstocks.

6. A coupling arrangement according to claim 5 wherein each end of each side rod or plunger has freely mounted upon it at the inner side of the headstock through which it extends, two compression plates between which a control spring is arranged, abutments for said bearing plates being carried by the headstock and the arrangement being such that when the vehicles are travelling round a curve the springs of the inner side rod or plunger are compressed by the compression plates which are nearest the headstock and against which shoulders on the rod or plunger abut, whilst the springs of the outer side rod or plunger are simultaneously compressed by the compression plates farthest from the headstocks and against which abut washers or collars on the rod or plunger backed by nuts or otherwise secured to the same.

7. A coupling arrangement according to claim 6 wherein each control or steadying spring and its compression plates are contained in a casing or guide the ends of which form the abutments for the spring compression plates and the said casing or guide is trunnioned or otherwise mounted to rock in a bearing bracket or brackets secured to the headstock or to adjacent members of the vehicle underframe.

In testimony whereof I affix my signature.

HERBERT NIGEL GRESLEY.